US009301642B2

(12) United States Patent
Garman

(10) Patent No.: US 9,301,642 B2
(45) Date of Patent: Apr. 5, 2016

(54) METHOD OF BREWING AND DISPENSING COFFEE TO A MUG

(71) Applicant: Hamilton Beach Brands, Inc., Glen Allen, VA (US)

(72) Inventor: Michael Garman, Moseley, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 14/310,100

(22) Filed: Jun. 20, 2014

(65) Prior Publication Data
US 2014/0302210 A1 Oct. 9, 2014

Related U.S. Application Data

(60) Continuation of application No. 14/025,991, filed on Sep. 13, 2013, now abandoned, which is a division of application No. 13/190,545, filed on Jul. 26, 2011, now Pat. No. 8,590,445, which is a continuation of application No. 11/466,868, filed on Aug. 24, 2006, now abandoned, which is a continuation-in-part of application No. 10/838,307, filed on May 4, 2004, now Pat. No. 7,543,528.

(51) Int. Cl.
*A23F 5/26* (2006.01)
*A47J 31/46* (2006.01)
*A47J 31/057* (2006.01)
*A47J 31/44* (2006.01)

(52) U.S. Cl.
CPC ............. *A47J 31/46* (2013.01); *A23F 5/262* (2013.01); *A47J 31/057* (2013.01); *A47J 31/0573* (2013.01); *A47J 31/44* (2013.01); *A47J 31/4457* (2013.01); *A47J 31/467* (2013.01); *A47J 2203/00* (2013.01)

(58) Field of Classification Search
CPC ....... A47J 31/46; A47J 31/467; A47J 31/057; A47J 31/0573; A47J 31/44; A47J 31/4457; A23F 5/262; A23F 31/0636
See application file for complete search history.

(56) References Cited

U.S. PATENT DOCUMENTS

| 1,491,825 A | * | 4/1924 | Schwall | 99/315 |
|---|---|---|---|---|
| 1,572,221 A | | 2/1926 | Peterson | |
| 2,174,096 A | * | 9/1939 | Shaw | 126/375.1 |
| 2,568,840 A | * | 9/1951 | Zees | 99/282 |
| 3,348,469 A | * | 10/1967 | Kasakoff | 99/320 |
| 3,361,052 A | * | 1/1968 | Weber | 99/299 |
| 3,934,757 A | | 1/1976 | Malek | |
| 4,069,750 A | | 1/1978 | Kemp | |
| 4,100,394 A | | 7/1978 | Tillip | |
| 4,141,286 A | | 2/1979 | Smit | |
| D261,657 S | | 11/1981 | Villa | |
| 4,309,939 A | | 1/1982 | Stover | |
| 4,360,128 A | | 11/1982 | Neumann | |
| 4,532,142 A | | 7/1985 | Dean | |
| 4,572,060 A | | 2/1986 | Yung-Kkuan | |
| 4,610,145 A | | 9/1986 | Arzberger et al. | |

(Continued)

*Primary Examiner* — Anthony Weier
(74) *Attorney, Agent, or Firm* — Alexander D. Raring

(57) ABSTRACT

A method for operating a hot beverage maker includes the steps of infusing fresh water and storing the resulting beverage in a removable brewed beverage tank. An actuator is engaged for dispensing the brewed beverage from the tank. The tank is placed on a platform in a relationship so as to engage a warmer plate to keep the contents of the tank warm. Accordingly, the hot beverage maker produces a brewed beverage that is stored in the tank until it is dispensed by a user.

2 Claims, 7 Drawing Sheets

(56) References Cited

U.S. PATENT DOCUMENTS

| | | | |
|---|---|---|---|
| 4,624,177 A | 11/1986 | Lto et al. |
| 4,706,555 A | 11/1987 | Nakamura et al. |
| 4,748,901 A | 6/1988 | Burmeister |
| 4,749,107 A | 6/1988 | Stover |
| 4,770,090 A | 9/1988 | Woon et al. |
| 4,800,935 A | 1/1989 | Buchser et al. |
| 4,811,657 A | 3/1989 | Rixen |
| 4,825,758 A | 5/1989 | Snowball et al. |
| 5,033,273 A | 7/1991 | Buchser et al. |
| 5,060,558 A | 10/1991 | Beumer et al. |
| 5,133,247 A | 7/1992 | Pastrick |
| 5,231,918 A | 8/1993 | Grzywna |
| 5,239,914 A | 8/1993 | Salomon et al. |
| RE34,473 E | 12/1993 | Ryan et al. |
| 5,269,154 A | 12/1993 | Schmidt |
| 5,463,932 A | 11/1995 | Olsen |
| D365,579 S | 12/1995 | Baker et al. |
| 5,474,213 A | 12/1995 | Umger |
| D367,659 S | 3/1996 | Baker et al. |
| 5,560,284 A | 10/1996 | Weidman et al. |
| D377,290 S | 1/1997 | Saltet |
| 5,611,262 A | 3/1997 | Rizzulo et al. |
| 5,649,471 A | 7/1997 | Heynderickx et al. |
| 5,687,636 A | 11/1997 | Diore et al. |
| 5,791,523 A | 8/1998 | Oh |
| 5,857,596 A | 1/1999 | Lee |
| D407,262 S | 3/1999 | Dingelstad |
| 5,881,930 A | 3/1999 | Lee |
| D407,593 S | 4/1999 | Hu et al. |
| D408,208 S | 4/1999 | Hsu |
| 5,957,036 A | 9/1999 | Warmer et al. |
| 5,964,143 A | 10/1999 | Driscoll |
| 5,970,849 A | 10/1999 | Baumann et al. |
| D417,358 S | 12/1999 | Dutruel |
| 6,003,734 A | 12/1999 | Oh |
| 6,009,792 A | 1/2000 | Kraan |
| 6,009,793 A | 1/2000 | Blankenship et al. |
| D419,821 S | 2/2000 | Powell et al. |
| 6,101,924 A | 8/2000 | Blankenship et al. |
| 6,118,933 A | 9/2000 | Roberson |
| D432,850 S | 10/2000 | Saltet |
| 6,135,173 A | 10/2000 | Lee et al. |
| 6,164,191 A | 12/2000 | Liu et al. |
| 2008/0216663 A1* | 9/2008 | Williamson | 99/279 |

\* cited by examiner

US 9,301,642 B2

METHOD OF BREWING AND DISPENSING COFFEE TO A MUG

This application is a continuation of U.S. application Ser. No. 14/025,991 now abandoned, which is a divisional of U.S. application Ser. No. 13/190,545, filed Jul. 26, 2011, now U.S. Pat. No. 8,590,445; which is a continuation of abandoned U.S. application Ser. No. 11/466,868, filed Aug. 24, 2006; which is a continuation-in-part of U.S. application Ser. No. 10/838,307, filed May 4, 2004, now U.S. Pat. No. 7,543,528; which is a continuation of U.S. application Ser. No. 10/720,769, filed Nov. 24, 2003, now U.S. Pat. No. 7,461,586; which is a continuation-in-part of U.S. application Ser. No. 10/403,438, filed Mar. 31, 2003, now U.S. Pat. No. 6,681,960; which is a continuation of U.S. application Ser. No. 10/011,759, filed Dec. 11, 2001, now U.S. Pat. No. 6,564,975. Each of these applications/patents are incorporated by reference herein.

FIELD OF THE DISCLOSURE

This disclosure relates to a convenient hot beverage maker having a dispenser thereby allowing a user to dispense any amount of beverage desired.

BACKGROUND OF THE INVENTION

Many types and styles of hot beverage makers, especially coffee makers, are known and have been sold for many years. The standard components in these coffee makers include a stand or tower that has a warming plate on the bottom and a filter basket at the top. The coffee maker further includes a carafe that rests on the warming plate and below the filter basket in order to receive brewed liquid from the filter basket.

A problem with traditional coffee makers is the mess that results from using the coffee maker. A user must clean both the carafe and filter basket after each use. Further, if there is no automatic pause and serve feature, then a user must wait for an entire batch to run before removing the carafe to pour a cup of coffee. Even after the batch is run, there may be additional drips that would spill onto the hot warming plate once a carafe is removed for pouring. A warming plate may become dirty with overflow or excess dripage, thereby causing an unappealing aroma.

Also, the use of a carafe is an extra step in the coffee making process. It is another component to place in a dishwasher or fill storage space. While a carafe is likely desirable if a user is pouring numerous cups, it typically takes two hands to pour a single cup of coffee—one hand for the cup and one hand for the carafe. Also, it is possible to cause a splash or spillage simply in the removal or reinserting process of the carafe into and out of the coffee maker stand.

SUMMARY OF THE INVENTION

Accordingly, the present disclosure overcomes the foregoing drawbacks and provides a hot beverage maker having a dispenser. This way, a carafe becomes unnecessary. Also, a user can easily dispense only as much coffee into a cup or mug as the user desires by using a single hand. The clean up process is simplified. All of the potential issues and problems related to using a carafe disappear.

In one embodiment, a hot beverage maker comprises a stand, a fresh water chamber, a brewed beverage tank, and actuator means for dispensing a brewed beverage. The tank comprises a filter basket, a reservoir portion, and an outlet port. The reservoir portion is adapted to hold a brewed liquid. The brewed beverage tank is removable from the stand. Also, the fresh water chamber may comprise transparent walls that allow the user to observe the fresh water level in the chamber. Also, alternatively, the brewed beverage tank may comprise a transparent window to allow a user to observe the brewed beverage level in the tank.

DETAILED DESCRIPTION

FIGS. 1 through 7 illustrate one or more embodiments of a hot beverage maker as disclosed herein. Naturally, a design engineer having ordinary skill with the assembly of coffee makers will be able to create a coffee maker that incorporates the teachings of the present invention, but which may look different and incorporate different, alternative parts. A cup-actuated dispenser makes the unit very convenient and very different from existing coffee makers that include, for instance, a carafe and other components unnecessary in the present invention.

Figure 1:
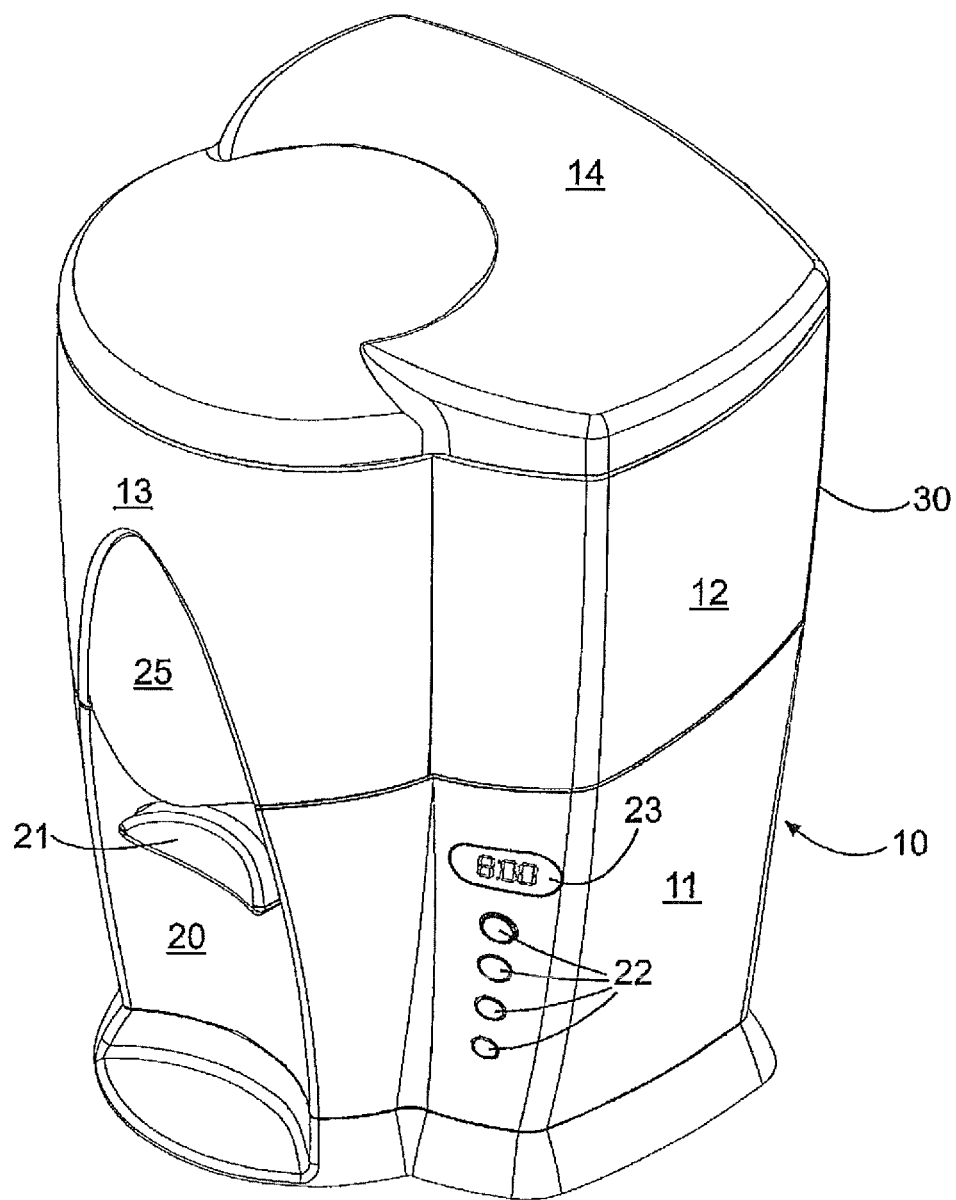
FIG. 1 is a perspective view of a one embodiment of a coffee maker in accordance with the present disclosure.

Turning now to FIG. 1, there is shown a coffee maker 10 that is made up of a stand 11, fresh water reservoir 12, brewed beverage tank 13, and a lid 14. The stand 11 forms the base of coffee maker 10 and supports the reservoir 12 and tank 13. The stand 11 includes a recess 20 in which is situated a push-button 21. Adjacent to recess 20 are the electrical switches 22 that operate the coffee maker 10 and allow the user to, for instance, program a start time or set the time of the clock 23. Of course, these electrical switches 22 may be analog or digital. Fewer or more controls may be applicable for a given model of coffee maker.

The fresh water reservoir 12 has transparent sidewalls 30. The transparent sidewalls 30 allow users to easily and immediately determine whether and how much fresh water is in the coffee maker 10. Of course, nontransparent walls may be used, or a vertical window slot could be used. A water level indicator may also facilitate the ability of a user to accurately gauge the water volume.

The fresh water reservoir 12 rests on the stand 11. The fresh water reservoir 12 wraps partially around the brewed beverage tank 13. The brewed beverage tank 13 also rests on the stand 11. The brewed beverage tank 13 has a transparent window 25 which allows a user to observe very easily and quickly how much brewed beverage is contained within the tank 13. Finally, a lid 14 is rotatably connected to back wall of the reservoir 12. The lid 14 is adapted to cover both the fresh water reservoir 12 and the brewed beverage tank 13.

Figure 2:
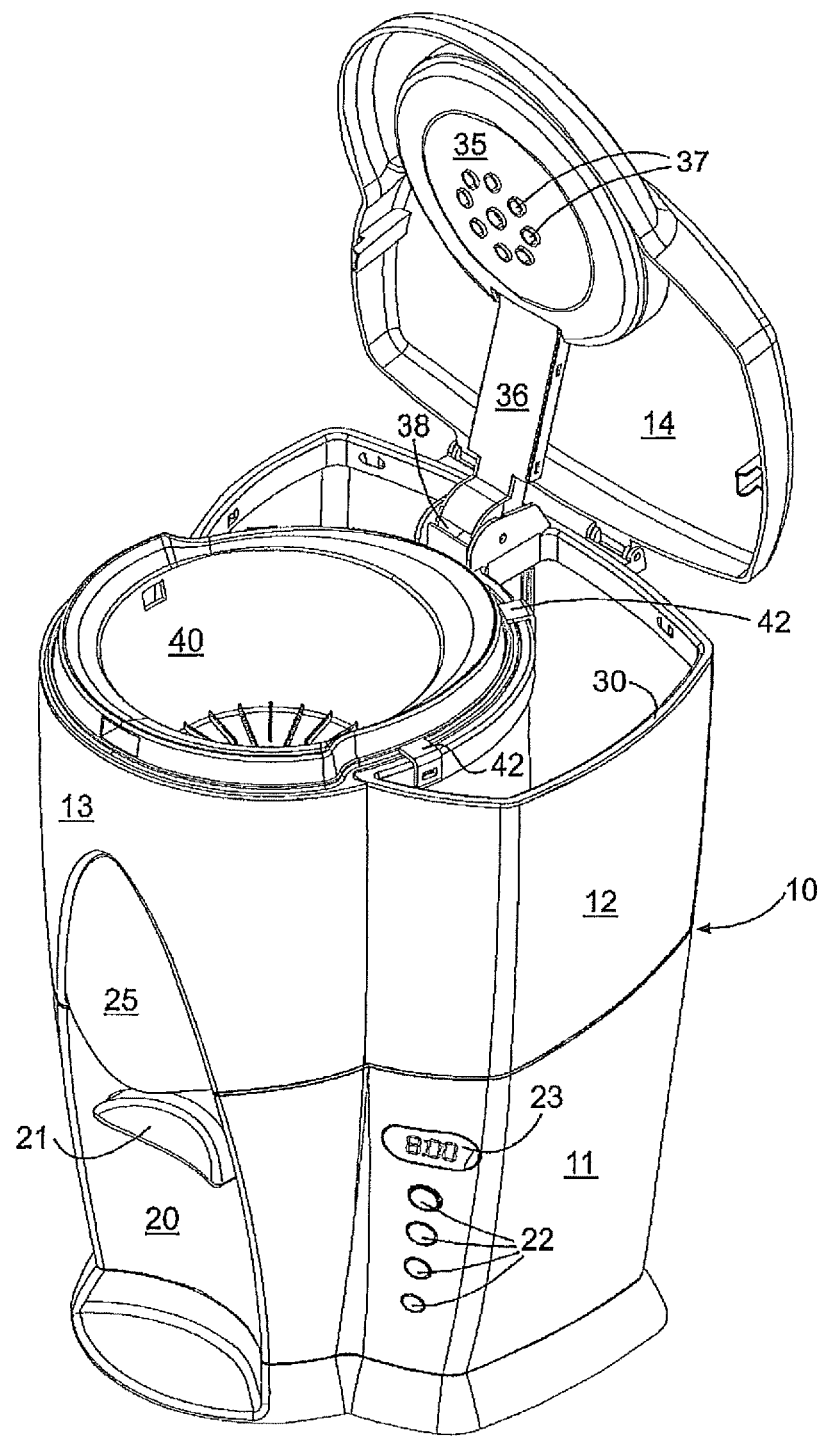
FIG. 2 is a perspective view of the coffee maker shown in FIG. 1 with the lid in the open position.

FIG. 2 is similar to FIG. 1 except that the lid 14 is rotated up to the open position in FIG. 2. With the lid 14 open, there can be seen a removable filter basket 40 that is mountable with the brewed beverage tank 13. The showerhead 35 is connected to the lid 14 and rotates up and down with the lid. Support arm 36 is a channel connecting the showerhead 35 to the hot water tube shown in FIG. 4.

Figure 3:
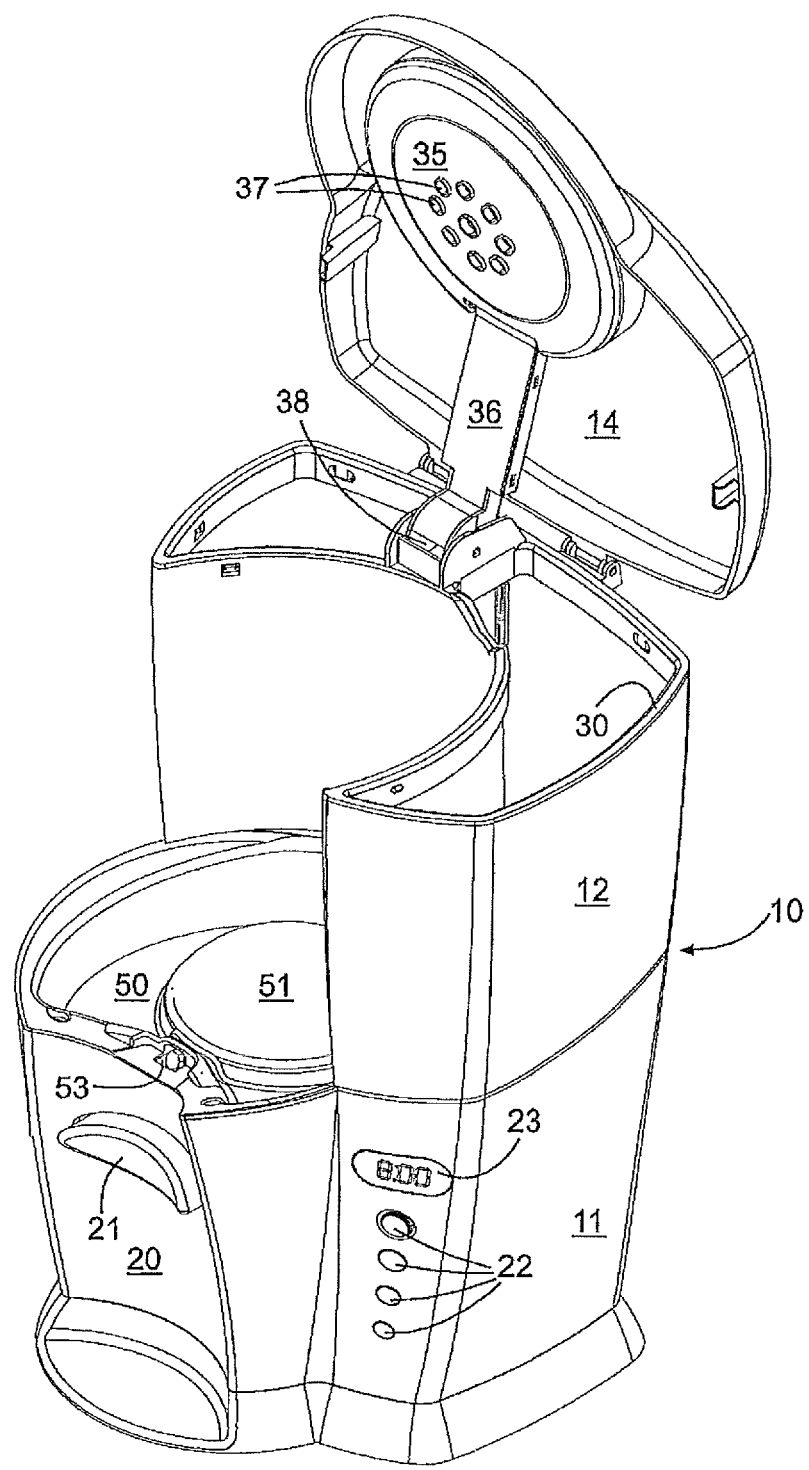
FIG. 3 is a perspective view of the coffee maker shown in FIGS. 1 and 2 with the brew tank removed and with the lid in the open position.

FIG. 3 is a still further view of the coffee maker 10 wherein the brewed beverage tank has been removed. The stand 11 includes a platform 50 which is adapted to support the brewed beverage tank shown in the other figures. The apertures 37 on the bottom of the showerhead 35 allow for the even distribution of water into the filter basket when the showerhead/lid is in the down position. The end of the arm portion 36 of the showerhead 35 includes an aperture 38. When the lid 14 is rotated open, the aperture 38 rotates around and diverts the flow of hot water back into the fresh water reservoir 12.

The platform 50 includes a warmer plate 51 which is adapted to engage the bottom of the brewed beverage tank to keep a brewed beverage inside the tank warm. The platform 50 is molded in part into a recess that is adapted to receive in a mating fashion the molded male portion 110 (see FIG. 7) of the bottom of a brew tank. In this mating relationship, the tank is properly aligned and retained in position in the stand 11. Referring briefly back to FIG. 2, hooks 42 engage the top of the fresh water tank walls 30 to work with the male portion 110 to properly position the tank 13 on the stand 11. Finally, the platform 50 includes an aperture 53 from which protrudes a lever that makes up part of the dispenser actuator. (See FIGS. 4-6).

Figure 4:
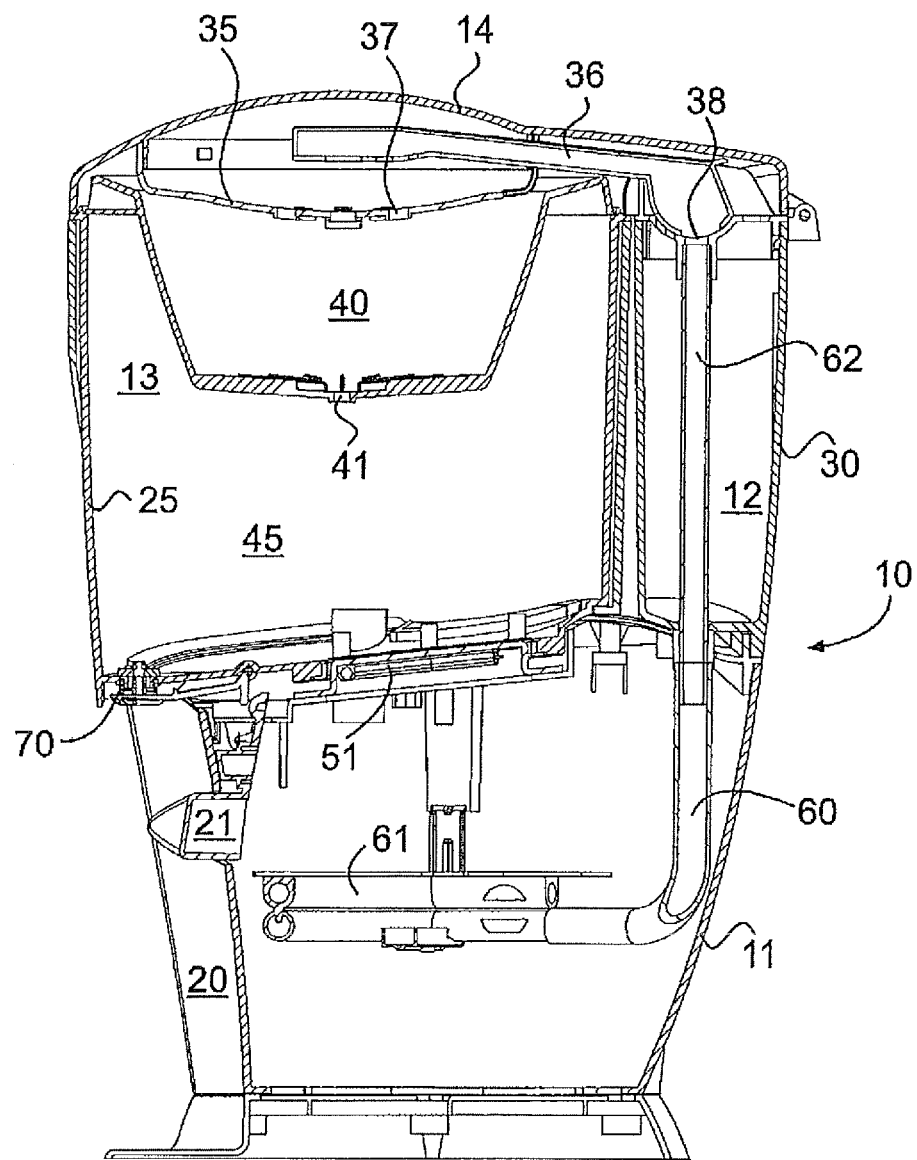
FIG. 4 is a side elevation, cross sectional view of the coffee maker shown in FIG. 1.

FIG. 4 is a cross sectional view of the coffee maker 10 that provides a view of the operational components of the coffee maker. The portions of the coffee maker 10 not previously shown include the water tube 60 which carries heated water from the hot water heater element 61 up to the pipe 62 and then showerhead 35 via the arm 36. The top of the pipe 62 is hingedably connected to the end of the arm 36. The arm 36 includes an aperture 38 which is aligned with an opening to the pipe 62 when the showerhead 35 and lid 14 are in the down position as shown. However, when the showerhead 35/lid 14 are swivelled upwardly, the aperture 38 is rotated around and hot water is rerouted back into the fresh water reservoir 12 to prevent any water flow out of the showerhead when it is in the up position. Although not shown, there is a further tube that is adjacent to the tube 60 that carries the fresh cold water from the fresh water reservoir 12 through the heater coil 61 to the hot water pipe 62 as shown.

The brewed beverage tank 13 is made up of the filter basket 40 that has an aperture 41 at the bottom of the filter basket to allow the infused water to drip into the reservoir portion 45 of the brewed beverage tank 13. An outlet port 70 is the aperture through which the brewed beverage may be allowed to exit the brewed beverage tank 13. The filter basket 40 is conventional in structure and dimension in order to be easily usable. As is also evident from FIG. 4, the bottom of the reservoir portion 45 slopes generally from the back of the coffeemaker (i.e., the fresh water reservoir 12) to the front where the port 70 is fixed. This configuration allows full drainage out of the bottom towards the front of the tank 13 where a user's cup may be easily placed for dispensing.

Figure 5:
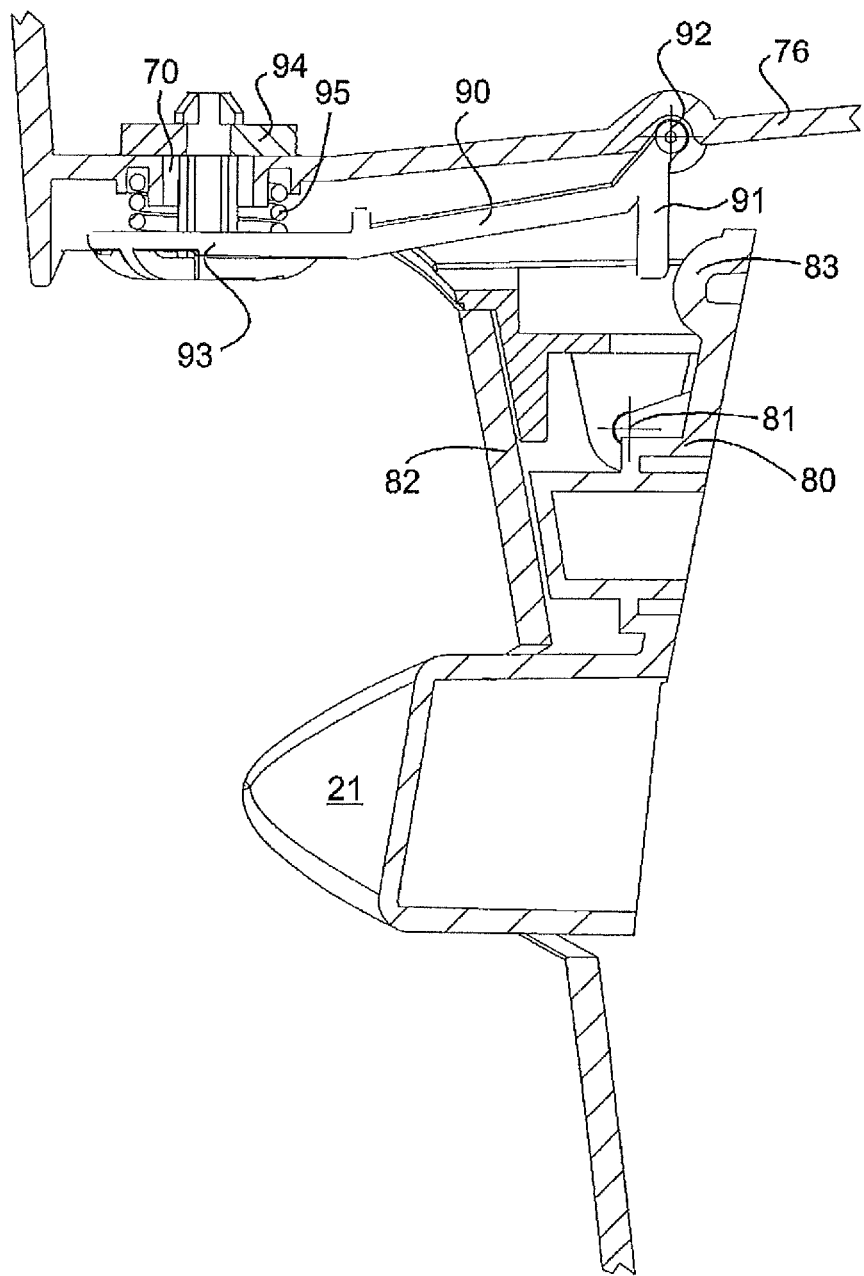
FIGS. 5 and 6 are side elevation cross sectional views detailing one embodiment of the dispenser actuator mechanism in accordance with one embodiment of the present disclosure.
Figure 6:
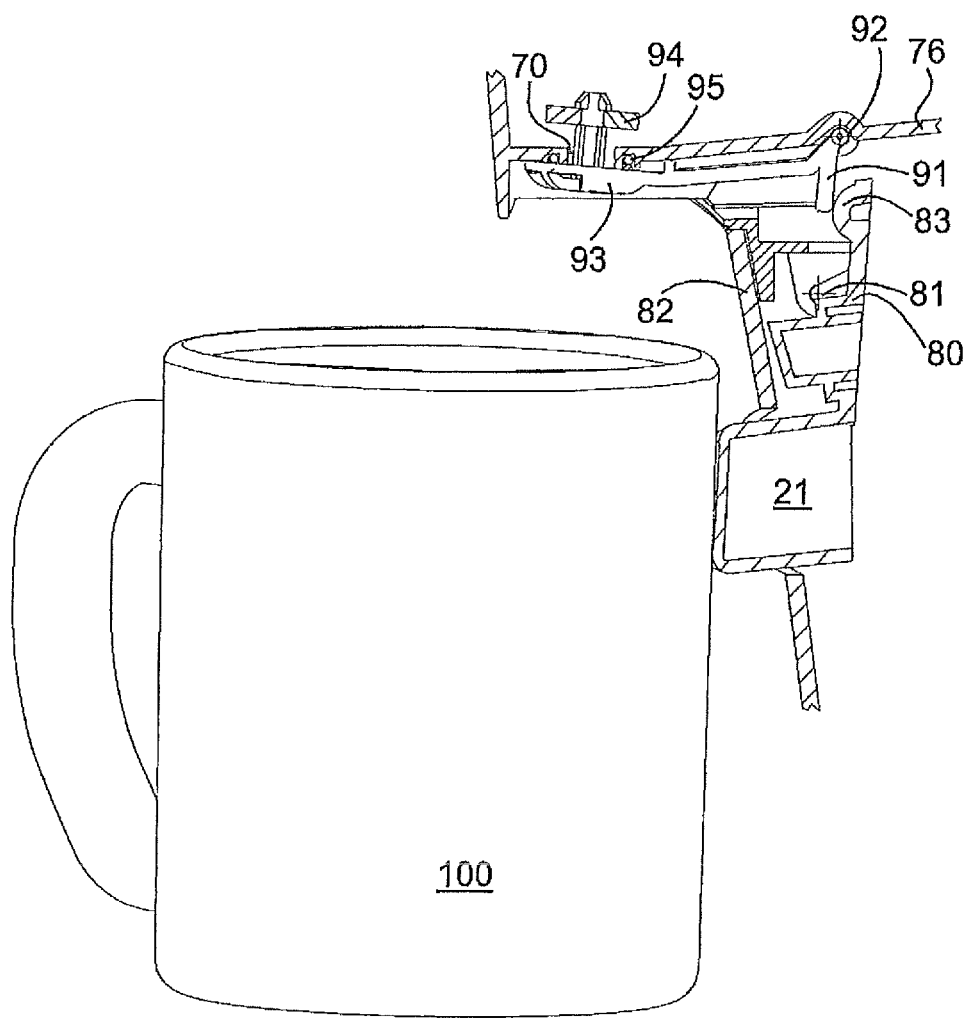

Turning now to FIGS. 5 and 6, there is shown one embodiment of a dispenser actuator mechanism in accordance with the present invention. FIGS. 5 and 6 demonstrate the mechanism in the biased closed position (FIG. 5) and in the open position as when a cup 100 is pressing against the push button 21 (FIG. 6).

Push button 21 is connected to one end of lever 80. Lever 80 has a pivot point 81 that is a hinge mounted behind the front face 82 of the stand 11. The opposite end 83 of the lever 80 protrudes through aperture 53 (see FIG. 3) that makes up a portion of the platform 50 of the stand 11. A second lever 90 is mounted onto the bottom 76 of the brew tank 13. The lever 90 has a first end 91 and a second end 93 that are on opposite ends with a pivot 92 mounted on the bottom portion 76. Further, a spring 95 biases the first end 91 of the lever 90 downwardly so that the second end 93 is biased in a downward position. Plug 94 is adapted to seal the outlet port 70 of the brew tank 13. The plug 94 is connected to second end 93 and is urged upwardly or downwardly based on the movement of the second end 93 of the second lever 90. In the closed position shown in FIG. 5, the spring 95 urges the first end 91 downwardly so that the second end 93 is urged downwardly. Accordingly, the plug 94 is securely sealed to the outlet port 70. Alternatively, as demonstrated in FIG. 6, end 83 of the first lever 80 urges the first end 91 of the second lever 90 against the bias of the spring 95. This moves the second end 93 of the second lever 90 upwardly to thereby open the outlet port 70 and allow brewed beverage to flow out of the brew tank 13.

While the "two-piece" actuator illustrated in FIGS. 4, 5 and 6 is one type of cup-actuated dispensing means, there are, of course, alternative types of dispenser actuators. There are numerous types of electronic dispensers that are well known in the refrigerator door ice and dispensers. Similarly, other types of mechanical dispensers may be designed to accommodate the specific engineering needs of a given coffee maker structure.

Figure 7:
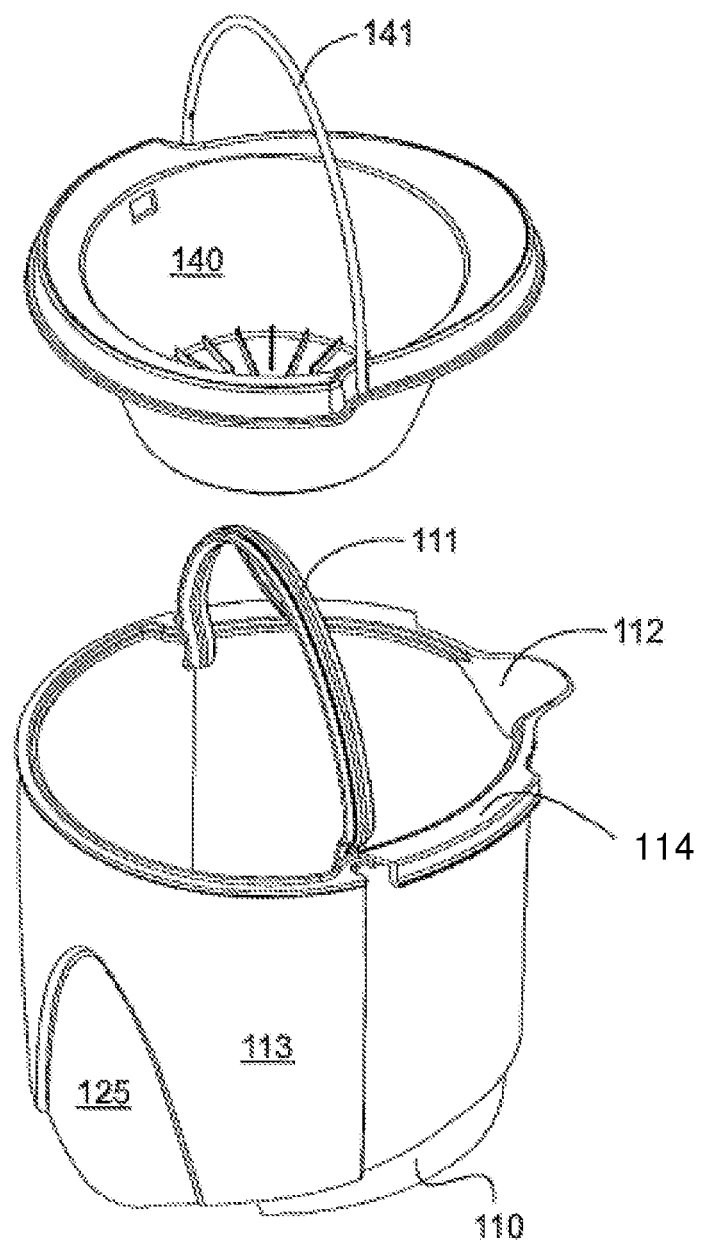
FIG. 7 is a perspective view of another embodiment of a brew tank and filter basket as disclosed herein.

FIG. 7 displays further embodiments of the brew tank 113 and filter basket 140. The filter basket 140 is different from the earlier described filter basket 40 in that it includes a handle 141 for making removal very simple. Similarly, the alternative brew tank 113 includes a handle 111 to facilitate handling. The brew tank 113 also has a transparent window 125 allowing a user to observe the brewed beverage volume inside. A spout 112 improves the use of the brew tank as a fresh water bucket to transfer fresh water from a sink or other source and pour it into the fresh water reservoir 12. Finally, lip 114 is merely a design variation of the hooks 140 which allow the brew tank 113 to engage the top of the fresh water reservoir walls 30 to secure the brew tank 113 in place once it is mounted on the platform 50. The male portion 110 is the molded piece of the bottom of the brew tank 113 which is received in the platform 50.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A method of brewing and dispensing coffee to a mug comprising the steps of:
    setting a clock provided with a hot beverage maker;
    supplying a volume of heated water to a filter basket in the hot beverage maker;
    infusing the water with a material to create a brewed beverage;
    directing the brewed beverage from the filter basket into a brewed beverage tank;
    holding the brewed beverage in the brewed beverage tank;
    engaging the bottom of the brewed beverage tank to a warmer plate to keep a brewed beverage inside the tank warm;
    energizing a heater adjacent to the warmer plate to keep the brewed beverage in the brewed beverage tank heated;
    pressing a brewed beverage receptacle against a dispenser actuator provided with the hot beverage maker to dispense the brewed beverage from the brewed beverage tank to the brewed beverage receptacle via an outlet; and subsequently removing the brewed beverage tank from the hot beverage maker.

2. A method of brewing and dispensing coffee to a mug comprising the steps of:

transporting fresh water to a hot beverage maker via a brewed beverage tank;

pouring fresh water into a fresh water reservoir provided by the hot beverage maker;

placing the brewed beverage tank on the hot beverage maker;

engaging the bottom of the brewed beverage tank to a warmer plate;

heating the fresh water;

supplying a volume of the heated fresh water to a filter basket in the hot beverage maker;

infusing the water with a material to create a brewed beverage;

directing the brewed beverage from the filter basket into the brewed beverage tank;

holding the brewed beverage in the brewed beverage tank;

energizing a heater adjacent to the warmer plate to keep the brewed beverage in the brewed beverage tank heated; and engaging an actuator to dispense a brewed beverage from the tank to a brewed beverage receptacle via an outlet.

\* \* \* \* \*